United States Patent

[11] 3,633,776

[72] Inventor Dan W. Moore
 Glenboro, Manitoba, Canada
[21] Appl. No. 7,825
[22] Filed Feb. 2, 1970
[45] Patented Jan. 11, 1972

[54] HYDRAULICALLY CONTROLLED FLATBED TRAILER
 4 Claims, 4 Drawing Figs.
[52] U.S. Cl................................................ 214/512,
 280/43.11, 280/43.23
[51] Int. Cl........................................... B60p 1/02
[50] Field of Search........................................ 214/512,
 506; 280/43.11, 43.23

[56] References Cited
UNITED STATES PATENTS

| | | | |
|---|---|---|---|
| 3,448,878 | 6/1969 | Schindler | 214/512 |
| 3,322,292 | 5/1967 | Bogh et al. | 214/512 |
| 3,442,409 | 5/1969 | Larson | 214/512 |
| 2,681,811 | 6/1954 | Green | 280/43.23 X |
| 2,869,887 | 1/1959 | Westberg | 280/43.11 X |
| 3,199,696 | 8/1965 | Chrysler et al. | 214/512 |
| 3,135,401 | 6/1964 | Schramm | 214/512 X |

Primary Examiner—Albert J. Makay
Attorney—Kent & Ade

ABSTRACT: A flatbed trailer that has hydraulically raised and lowered rear wheels and hydraulically raised and lowered front attaching means to a tractor so that the bed can be lowered flat on the ground for loading heavy machinery and equipment thereon.

PATENTED JAN 11 1972

INVENTOR.
DAN W MOORE
BY
Kent & Ade
AGENT

INVENTOR.
DAN W MOORE
BY
AGENTS

HYDRAULICALLY CONTROLLED FLATBED TRAILER

This invention relates to new and useful improvements in flat bed or ground bed trailers adapted to be connected to a source of motive power such as a tractor cab unit by what is conventionally known as a fifth wheel.

Under normal circumstances, loading is accomplished from a dock or the like, but when such flatbed trailers are used on the farm or in the construction industry, it is often very difficult to drive equipment onto the flat bed for transportation purposes. It is therefore usual to use relatively heavy timbers in the form of ramps, or alternatively, drive the flat bed into a ditch so that the bed is substantially level with the ground abounding the ditch thereby enabling heavy equipment to be driven directly onto the flat bed.

Both of these methods contain obvious disadvantages and it has been found that considerable time is wasted in loading and unloading heavy equipment from flat beds to the ground at the working area.

Furthermore, damage often occurs to the flat bed particularly when loading such equipment as bulldozers and the like.

The present invention overcomes of all these disadvantages usually found with such equipment by providing a flat bed which can be raised or lowered hydraulically so that it can be either flat on the ground or, can be raised to the towing position.

This enables equipment to be driven or pulled onto the flat bed with a minimum of effort. It also enables, with the addition of detachable truck sides, cattle to be loaded and unloaded without the necessity of providing chutes or ramps.

It is particularly suited for use with cattle or the like inasmuch as it can be driven alongside a barn door and then raised or lowered until the flat bed is exactly level with the barn floor thus enabling cattle to walk onto or from the flat bed easily and readily. It is well known that cattle often balk at climbing chutes or the like and I have found that it makes it easier to move cattle from the flat bed to the barn floor and vice versa without too much difficulty.

The principal object and essence of the invention is therefore to provide a device of the character herewithin described in which the flat bed portion thereof can be lowered flat upon the ground for loading and unloading purposes and then can be raised to the normal towing position hydraulically.

A further object of the invention is to provide a device of the character herewithin described in which the flat bed can be raised by separate means, clear of the ground so that access can be obtained via the panels to the underside of equipment mounted thereon.

A further object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced or included in the method, process, construction, composition, arrangement or combination of parts, or new use of any of the foregoing, of which concept, one or more specific embodiments of same are herein exemplified as illustrative only of such concept, reference being had to the accompanying Figures in which:

In the drawings like characters of reference indicate corresponding parts in the different figures.

Figure 1:
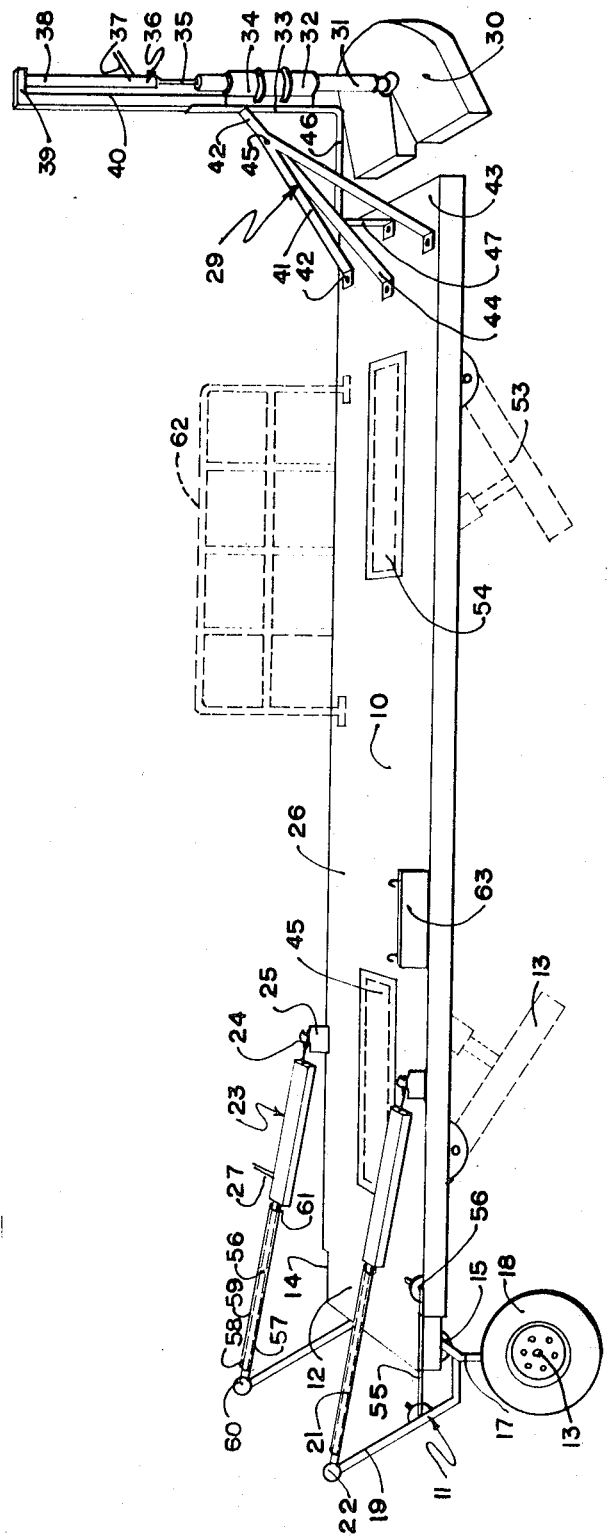
FIG. 1 is an isometric view of the device shown in the raised position.
Figure 4:
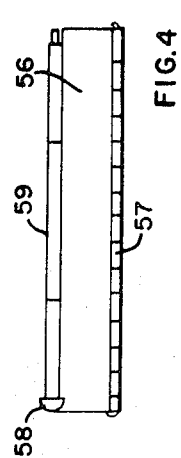
FIG. 4 is an enlarged side elevation of one of the locking cylinders per se.

Proceeding therefore to describe the invention in detail, I have provided a substantially rectangular flat bed 10 constructed in the usual manner and having a rear wheel assembly collectively designated 11, secured to the rear end 12 thereof. This rear wheel assembly includes a transversely situated axle 13 which extends upon each side of the rear end within cutout portions 14 formed in the sides of the flat bed as clearly shown. Although a single axle 13 is shown, nevertheless it will be appreciated that individual axles can be provided if necessary.

Extending downwardly substantially at right angles from the ends 15 of the axles 13, is a wheel arm 17 which carries means (not illustrated) to mount a ground engaging wheel 18 upon the lower end thereof, it being understood that there is one such wheel upon each side of the flat bed.

Although two wheels are indicated in the present instance, nevertheless it will be appreciated that a plurality of wheels can be provided on common axles, if the load to be carried is excessive.

Extending rearwardly and upwardly also from the ends 15 of the wheel axles 13 is an actuating arm 19 and one end 20 of the piston rod 21 is pivotally connected to the distal end of this arm by pivot pin 22.

The piston rod forms part of an hydraulic piston and cylinder assembly 23, the cylinders of which are pivotally mounted by means of pivot pins 24, to lugs 25 secured to the upper surface 26 of the flat bed as clearly illustrated in FIG. 1.

Hydraulic hoses 27 extend from the cylinder to a source of hydraulic energy upon a source of motive power shown in phantom by reference character 28 so that the piston rods can be extended or retracted as desired.

When extended as shown in FIG. 1, the wheels 18 are situated so that the rear end 12 of the flat bed is raised from the ground in what I define as the towing position.

Figure 3:
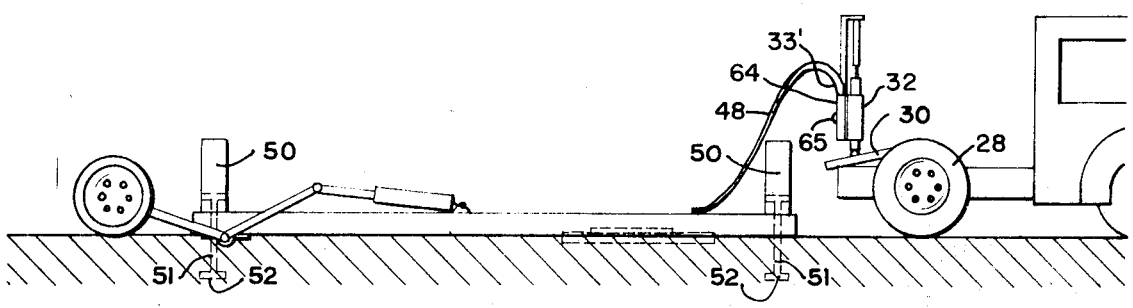
FIG. 3 is a side elevation of the device showing same in the lowered or ground engaging position.

However, if the piston rods are retracted as shown in FIG. 3, then the rear end 12 of the flat bed engages the ground as clearly illustrated.

It will of course, be appreciated that control of the piston and cylinder assembly 23 can position the rear end 12 of the flat bed in any desired position between the full raised position in FIG. 1 and the fully lowered position in FIG. 3.

Means collectively designated 29 are provided to attach the flat bed to the towing means 28. The towing means 28 is preferably but not necessarily a tractor cab unit or a tractor either of which is provided with a conventional fifth wheel unit shown schematically by reference character 30. This mounts units on the back of the tractor cab unit for towing purposes yet provides a pivotal connection for turning purposes.

The means 29, shown in FIG. 1, includes a standard 31 pivotally secured to the fifth wheel 30 by conventional means (not illustrated), a sleeve 32 engages over the standard for vertical sliding movement thereon and this sleeve is secured to the lower substantially vertical support member 33 by means of U-bolt assemblies 34.

A piston rod 35 forms an upward extension of the standard 31 and forms part of a piston and cylinder assembly collectively designated 36, with hydraulic hoses 37 extending to a source of hydraulic power (not illustrated) on the source of motive power 28.

The upper end 38 of this cylinder is connected to the upper end 39 of an upper vertical support member 40 forming part of the aforementioned lower vertical support member 33.

A divergent brace means 41 extends downwardly and rearwardly from the support members 40 and 33, substantially at the junction 42 thereof and these divergent braces are secured as by bolts 42', to the front end 43 of the flat bed. A central brace 44 is also provided extending from the flat bed 43 to the junction 45 between the divergent members 41.

The lower vertical support member 33 extends horizontally as at 46 and then downwardly as at 47 and in turn is bolted to the flat bed thus giving a firm anchorage at this point.

In operation, relative extension of the piston rod 35 from cylinder 36 causes sleeve 32 to slide upwardly on standard 31, taking with it the front end 43 of the flat bed.

Conversely, the relative retraction of the piston rod 35 from cylinder 36 causes the sleeve 32 to slide down standard 31 thus lowering the front end 43 of the flat bed to the position shown in FIG. 3, namely flat upon the ground.

Figure 2:
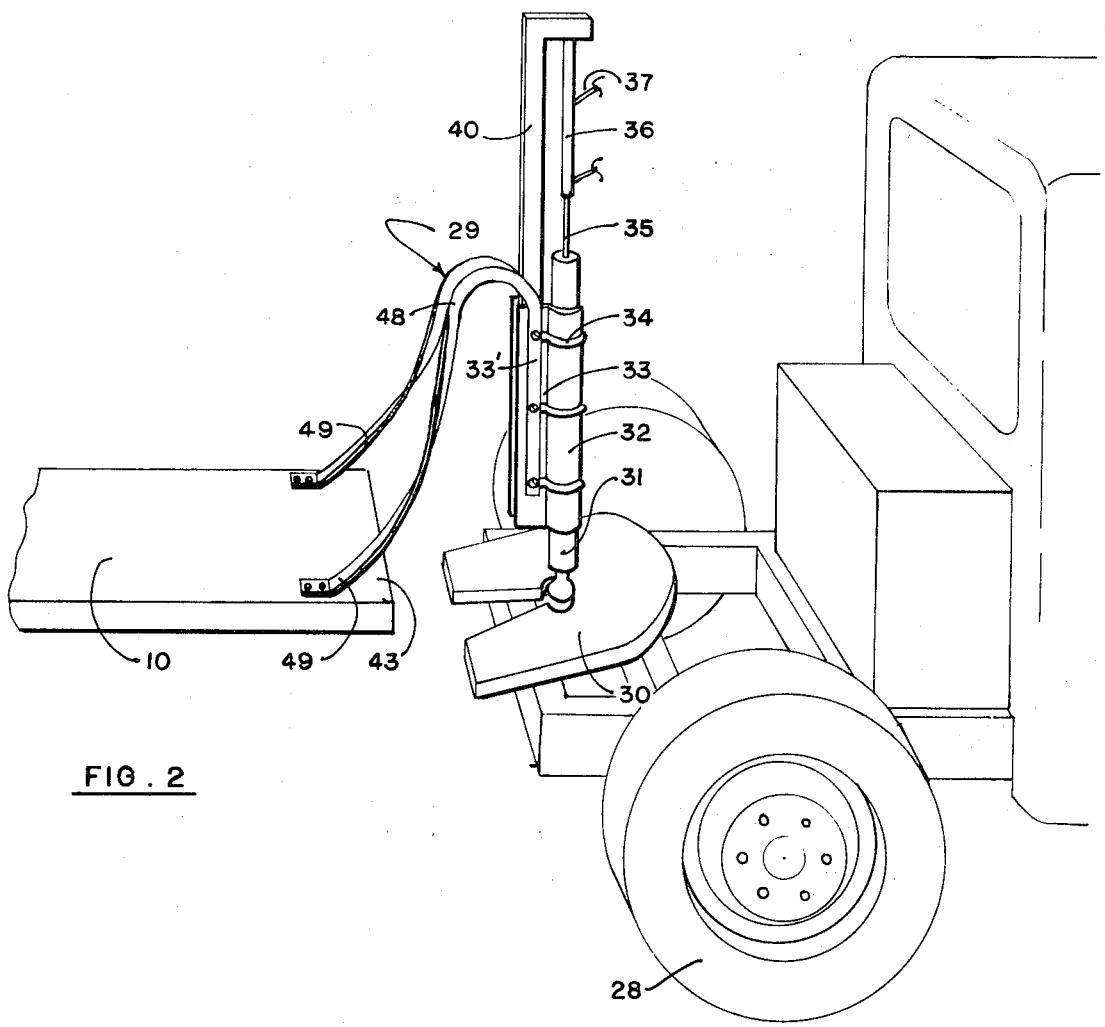
FIG. 2 is a fragmentary side elevation showing the front end of the device with an alternative construction of the attaching portion.

FIG. 2 shows an alternative construction of the front end attaching means 29 and corresponding parts have been given similar character references.

The sleeve 32 slides upon the standard 31 and the piston rod 35 extends upwardly from the upper end of the standard and engages within the hydraulic piston and cylinder assembly 36.

The upper vertical support member 40 mounts the upper end of the cylinder assembly 36 as hereinbefore described and the lower vertical support member 33 extends downwardly to be secured to the sleeve 32 by means of U-bolt assemblies 34.

A gooseneck member 48 extends from the junction between the upper and lower members 40 and 33 and this gooseneck member diverges upwardly to form a pair of brace members 49 which in turn are bolted to the front end 43 of the flat bed in a manner similar to the brace members 41 hereinbefore described.

The operation of this portion of the device is, of course, similar to that hereinbefore described.

I have provided separate means to raise and lower the flat bed relative to the ground to a greater extent than that provided by the rear wheel assemblies 11 and the front attaching means 29. Pairs of piston and cylinder assemblies 50 are secured to the front and rear ends of the flat bed with the piston rods 51 extending downwardly through the floor and having pads 52 upon the lower ends thereof. These are connected to the source of hydraulic pressure and extension of the piston rods from the cylinders will of course raise the flat bed above the ground.

Alternatively, truck-hoist-type devices shown in phantom and indicated by reference character 53, may be mounted on the underside of flat bed once again enabling same to be raised clear of the ground.

This is particularly useful when work is required to be done upon equipment mounted on the flat bed. I provide detachable access panels 54 at the front and rear of the flat bed which, when removed, enables a workman to stand underneath the flat bed and reach the underside of the equipment mounted upon the flat bed.

When in the towing position shown in FIG. 1, it is sometimes desirable to remove the load from the hydraulic piston and cylinder assembly 23 so I provide a detachable locking link 55 extending between the actuating arms 19 and lugs 56 on the sides of the flat bed.

However I prefer to utilize locking sleeves 56 shown in FIG. 1 surrounding the piston rods. These consist of a pair of semicylindrical casing hinged along one edge as at 57 and having a detachable pin connection 58 engageable within interlocking hinge cylinders 59 as clearly shown. When in positions surrounding the piston rod, the cylinder can be exhausted so that the load extends between the bearing knuckle 60 of the piston rod and the end 61 of the cylinder.

Reference character 62 illustrates detachable cattle truck sides which may be placed around the periphery of the flat bed when it is desired to carry cattle thereon.

I have also found it desirable to supply relatively small ramps 63 which can be hooked upon the sides thus facilitating the placement and removal of equipment upon the flat bed when the same is at ground level, said ramps of course, facilitating the movement vertically equivalent to the thickness of the flat bed.

Finally reference should be had to FIG. 2 in which reference character 64 illustrates, in phantom, a relatively short cylinder secured as by welding to the sleeve 32.

The downturned portion 33' of the gooseneck 48 engages within this cylinder and a pin 65 passes through the cylinder walls and through the portion 33' thus locking the gooseneck to the lifting assembly.

If it is desired to raise the flat bed as hereinbefore described, clear of the ground so that machinery or the like can be worked upon, removal of pin 65 permits this raising to take place yet still permits the trailer to be secured to the fifth wheel assembly. This not only facilitates the usefulness of the device but also acts as a safety factor in as much as the fifth wheel is of course attached to the tractor or towing means which can be anchored securely by the breaking system.

Once repairs have been done and the flat bed trailer lowered to its original position, pin 33' can be inserted thus locking the flat bed trailer to the lifting mechanism.

Various modifications can be made within the scope of the inventive concept which is herein disclosed and/or claimed.

What is claimed to be the present invention is:

1. A flat bed trailer adapted to be connected by the front end thereof to a source of motive power such as a tractor cab unit; said flat bed trailer comprising in combination a substantially rectangular flat bed, a rear wheel assembly mounted adjacent the rear end of said flat bed, means on the front end of said flat bed attaching same to the associated source of motive power, and means to raise and lower said flat bed from a ground engaging position to a towing position, said last-mentioned means including further means mounting said rear wheel assembly to said flat bed, said further means including an axle member pivotally secured transversely to said flat bed upon each side thereof, a wheel arm extending at an angle from said axle member, a ground engaging wheel on the end of each of said arms, an actuating link also extending at an angle from said axle member, hydraulic cylinder and piston assemblies extending between said flat bed and said actuating link, the extension and retraction of said piston and cylinder assembly raising and lowering said rear end of said flat bed relative to said ground engaging wheels, said means on the front end of said flat bed attaching same to said source of motive power including a substantially vertical standard secured to said source of motive power, a sleeve engaging said standard for sliding movement therealong, an attaching component secured to said flat bed and to said sleeve, and an hydraulic cylinder and piston assembly operatively connected between said attaching component and said standard, the extension and retraction of said cylinder and piston assembly raising and lowering respectively, the front end of said flat bed relative to the ground.

2. The device according to claim 1 which includes additional means to raise and lower said flat bed relative to the ground.

3. The device according to claim 1 in which said attaching component includes an upper substantially vertical support member, a lower substantially vertical support member secured to and extending downwardly from said upper member, said sleeve being secured to said lower support member, brace means extending from said attaching component to said flat bed, the piston rod of said piston and cylinder assembly constituting an extension of said standard, said cylinder of said piston and cylinder assembly being secured by one end thereof to the upper end of said upper vertical support member.

4. The device according to claim 2 in which said attaching component includes an upper substantially vertical support member, a lower substantially vertical support member secured to and extending downwardly from said upper member, said sleeve being secured to said lower support member, brace means extending from said attaching component to said flat bed the piston rod of said piston and cylinder assembly constituting an extension of said standard, said cylinder of said piston and cylinder assembly being secured by one end thereof to the upper end of said upper vertical support member.

* * * * *